(12) United States Patent
Gopal

(10) Patent No.: US 12,052,370 B2
(45) Date of Patent: Jul. 30, 2024

(54) MANAGING STATE IN ACCELERATORS

(71) Applicant: Intel Corporation, Santa Clara, CA (US)

(72) Inventor: Vinodh Gopal, Westborough, MA (US)

(73) Assignee: Intel Corporation, Santa Clara, CA (US)

(*) Notice: Subject to any disclaimer, the term of this patent is extended or adjusted under 35 U.S.C. 154(b) by 936 days.

(21) Appl. No.: 16/865,492

(22) Filed: May 4, 2020

(65) Prior Publication Data

US 2020/0266995 A1 Aug. 20, 2020

(51) Int. Cl.
*H04L 9/32* (2006.01)
*H04L 9/06* (2006.01)
(Continued)

(52) U.S. Cl.
CPC .......... *H04L 9/3242* (2013.01); *H04L 9/0631* (2013.01); *H04L 9/0825* (2013.01);
(Continued)

(58) Field of Classification Search
CPC ....... H04L 9/3242; H04L 9/3268; H04L 9/06; H04L 63/123; H04L 63/0435;
(Continued)

(56) References Cited

U.S. PATENT DOCUMENTS 5,146,460 A * 9/1992 Ackerman .............. G06F 30/33
714/33
5,969,726 A * 10/1999 Rentschler ............ G06T 15/005
345/506

(Continued)

FOREIGN PATENT DOCUMENTS

TW          1278755 B   *  4/2007  ............. G06F 13/28
TW       202121169 A   *  6/2021  ............. G06F 8/41
WO    WO-2017030766 A1 *  2/2017  ............. G06F 1/28

OTHER PUBLICATIONS

Dongyang Li, Qingbo Wang, Cyril Guyot, Ashwin Narasimah, Dejan Vucinic, Zvonimir Bandic and Qing Yang; "Hardware Accelerator for Similarity Based Data Dedupe"; IEEE (Year: 2015).*

(Continued)

*Primary Examiner* — Eleni A Shiferaw
*Assistant Examiner* — Ali H. Cheema
(74) *Attorney, Agent, or Firm* — Compass IP Law PC

(57) ABSTRACT

Methods and apparatus for managing state in accelerators. An accelerator performs processing operations on a data chunk relating to a job submitted to the accelerator. During or following processing the data chunk, the accelerator generates state information corresponding to its current state and stores the state information or, optionally, the accelerator state information is obtained and stored by privileged software. In connection with continued processing of the current data chunk or a next job and next data chunk, the accelerator accesses previously stored state information identified by the job and validates the state information was generated by itself, another accelerator, or privileged software. Valid state information is then reloaded to restore the state of the accelerator/process state, and processing continues. The chunk processing, accelerator state store, validation, and restore operations are repeated to process subsequent jobs. An accelerator and/or privileged software may use a MAC (Message Authentication Code) algorithm to generate a MAC over a message comprising the accelerator state information. The MAC is then used to validate previously stored state information.

20 Claims, 12 Drawing Sheets

(51) Int. Cl.
  *H04L 9/08* (2006.01)
  *H04L 9/40* (2022.01)
  *H04L 67/1001* (2022.01)
(52) U.S. Cl.
  CPC .......... *H04L 9/3268* (2013.01); *H04L 63/123* (2013.01); *H04L 67/1001* (2022.05); *H04L 2209/122* (2013.01)
(58) Field of Classification Search
  CPC ............. H04L 67/1001; H04L 2209/12; H04L 2209/122; G06F 3/0673; G06F 12/027; G06F 12/0811
  See application file for complete search history.

(56) References Cited

U.S. PATENT DOCUMENTS

| | | | | |
|---|---|---|---|---|
| 9,141,831 | B2* | 9/2015 | Mundra | H04L 9/065 |
| 11,134,140 | B2* | 9/2021 | Pope | H04L 69/16 |
| 11,237,996 | B2* | 2/2022 | Grohoski | G06F 15/7882 |
| 2005/0033960 | A1* | 2/2005 | Vialen | H04L 63/123 |
| | | | | 713/170 |
| 2005/0278502 | A1* | 12/2005 | Hundley | G06F 9/4843 |
| | | | | 712/34 |
| 2007/0011226 | A1* | 1/2007 | Hinni | H04L 67/01 |
| | | | | 709/203 |
| 2007/0011302 | A1* | 1/2007 | Groner | H04L 69/163 |
| | | | | 709/224 |
| 2007/0074218 | A1* | 3/2007 | Levy | H04Q 11/0067 |
| | | | | 718/102 |
| 2009/0016525 | A1* | 1/2009 | Bertoni | H04L 9/0637 |
| | | | | 380/255 |
| 2014/0281554 | A1* | 9/2014 | Maletsky | H04L 9/3268 |
| | | | | 713/175 |
| 2016/0098439 | A1* | 4/2016 | Dickie | G06F 16/215 |
| | | | | 707/693 |
| 2016/0139944 | A1* | 5/2016 | Rouwet | G06F 9/45558 |
| | | | | 718/1 |
| 2018/0006806 | A1* | 1/2018 | Wang | G09C 1/00 |
| 2018/0183900 | A1* | 6/2018 | Guilford | H04L 69/04 |
| 2018/0232254 | A1* | 8/2018 | Mohan | G06F 3/0632 |
| 2019/0045016 | A1* | 2/2019 | Dewan | H04L 67/142 |
| 2019/0095343 | A1* | 3/2019 | Gopal | G06F 12/1027 |
| 2019/0236022 | A1* | 8/2019 | Gopal | G06F 3/0673 |
| 2019/0243780 | A1* | 8/2019 | Gopal | G06F 12/0811 |
| 2020/0034214 | A1* | 1/2020 | Vanco | G06F 9/5005 |
| 2020/0111095 | A1* | 4/2020 | Osborn | H04L 63/0435 |
| 2020/0125461 | A1* | 4/2020 | Tanaka | G06F 11/2023 |
| 2021/0014049 | A1* | 1/2021 | Liu | H04L 9/0825 |
| 2021/0014050 | A1* | 1/2021 | Liu | H04L 9/0825 |
| 2021/0111735 | A1* | 4/2021 | Ugale | H03M 7/3091 |

OTHER PUBLICATIONS

Valery Sklyarov, Iouliia Skliarova, Joao Silva, Alexander Sudnitson, Artjom Rjabov; "Hardware Accelerators for Information Retrieval and Data Mining"; IEEE (Year: 2015).*

* cited by examiner

MANAGING STATE IN ACCELERATORS

BACKGROUND INFORMATION

Data analytics and "Big Data" processing have become increasingly important in recent years. Data analytics and Big Data workloads require processing huge amounts of data. One approach for processing such huge amounts of data is to distribute the processing tasks across large numbers of servers and process the workload in parallel. For example, the Apache Hadoop software framework enables tasks to be distributed across large numbers of commodity servers and process workloads using MapReduce. While Hadoop and MapReduce provide excellent scalability, they require a tremendous amount of inter-server communication (when implemented at large scale), and do not efficiently use processor and memory resources.

Some compute and memory-bandwidth intensive workloads such as used for data analytics and Big Data are hard to get the required level of performance with processor cores. To address this, so-called "accelerators" have been developed. Accelerators were initially implemented as components that were coupled to CPUs (central processing units) and managed as an IO (input-output) device with its own address space, which requires significant levels of IO communication to transfer data between the accelerator address space and applications running in system memory address space. Recently, CPUs employing System on a Chip (SoC) architectures with embedded accelerators have been introduced.

Current accelerators are designed with the ability for software to submit multiple jobs that are related and sequential, in order to process a large job. As an example, if we offload the decompression of a large file whose size is in the GByte range, this is done by software (application or lower-level library) breaking it up into Mbyte sized chunks, and processing each one sequentially. Each job will need to save its state (reflecting internal registers, memory content) at the end, and load state from the previous job before it can continue processing.

Existing approaches leaving a large number of potential exploits where a user-mode application can compromise the security of the processor, by submitting a job with carefully constructed state that bypasses known hardware checks and causes the accelerator to access memory or leak data from other jobs. Such exploits represent security threats.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
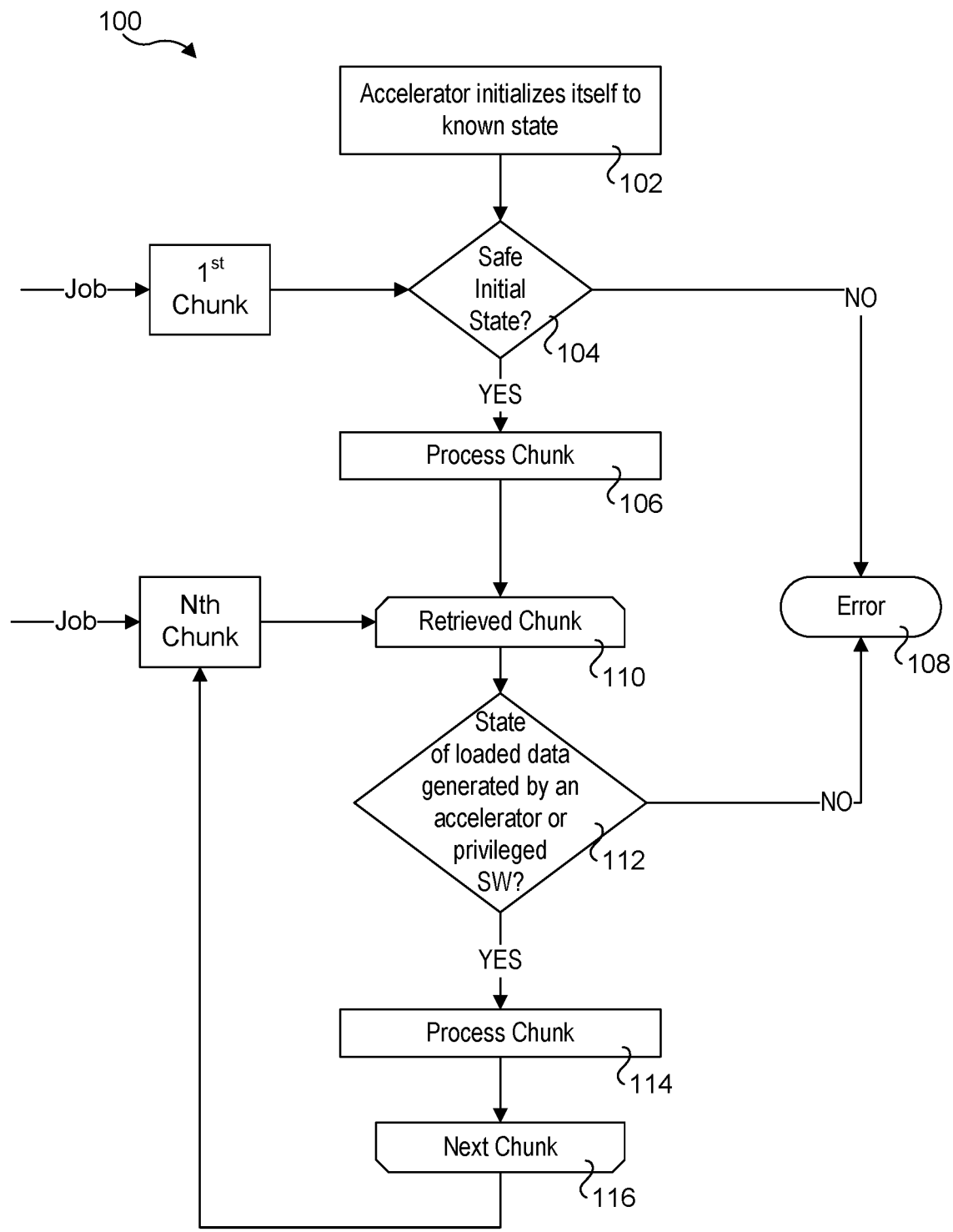
FIG. 1 is a flowchart illustrating operations and logic for managing accelerator state in connection with processing a sequence of jobs and associated data chunks, according to one embodiment.

Embodiments of methods and apparatus for managing state in accelerators are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Generally, an accelerator may include embedded circuitry and logic that is tailored to efficiently perform one or more specialized tasks, such as the decompression functions described and illustrated herein. The circuitry may be in the form of an ASIC (application-specific integrated circuit), or may include programmable circuitry/logic, such as provided via an FPGA (Field Programmable Gate Array). Such an FPGA may comprise one or more FPGA blocks, such as are available via license from various manufacturers. An FPGA block may also incorporate a custom design. Generally, the ASIC, FPGA block, or similar embedded circuitry and logic is referred to herein as a functional unit, which is designed to perform a corresponding function. A given accelerator may include one or more functional units.

More generally, an accelerator may also be referred to as an "engine," wherein the engine may be programmed to perform one or more dedicated functions. In some embodiments, an engine may operate in a similar manner to an embedded processor, and be enabled to execute instructions (e.g., accelerator application/function instructions) for dedicated functions. An engine may also combine both execution of instructions in combination with embedded circuitry and logic.

Accelerators have steadily improved in capability with one of the most significant recent trends being "shared virtual memory" (SVM)-capable accelerators. The traditional accelerator needed to be managed as an IO device in its own personal address space; this was accomplished with expensive kernel-mode drivers (KMD) that needed applications to cross back and forth between user and kernel-space, pinning pages in memory or copying user buffers to/from special buffers managed by the OS/Kernel-mode-driver. With SVM, the accelerator or IO device can directly work on the address space of user application thread running on a CPU, as it shares the same virtual→physical address translation capabilities as the user application thread. This is a key improvement in accelerator efficiency (from the point of view of data movement), enables user-mode submissions directly to the accelerators (via a "user-mode-driver" or UMD) and results in easier programming models and adoption. In some embodiments herein, platform architectures are configured to implement SVM-capable accelerators.

In accordance with aspects of the embodiments disclosed herein, methods and apparatus are provided to manage accelerator state in connection with processing sequences of jobs and associated data chunks. The method and apparatus provide enhanced security mechanisms for enabling accelerators to be used as user-mode accessible devices, among other implementations supported by the teaching and principles described herein. Under the method an accelerator stores its state or privileged software stores process state during or following processing of a job/data chunk, retrieves previously stored accelerator state or process state information, validates that the retrieved state information was generated by an accelerator or privileged software, and then reloads the accelerator state or loads the process state in preparation for processing a next job/data chunk or continued processing of a current job/data chunk.

FIG. 1 is a flowchart illustrating a high-level overview of the method, according to one embodiment. The process starts with a command or mode that is used by the accelerator to initialize itself to a known state, as depicted in a block 102. As shown in the left-side of FIG. 1, jobs submitted to the accelerator have one of two forms:

1) A new starting job, representing the first chunk of data; and
2) A continuation job which represents a subsequent (e.g., $N^{th}$) chunk of data As depicted in a decision block 104, if the accelerator receives a job of the first type, it ensures it is in the safe initial state, or can first set itself up in this state. If either of these conditions exists, the accelerator proceeds to process the chunk in a block 106. If the accelerator is not in a safe initial state or cannot set itself up in this state, the logic proceeds to an error end block 108.

Subsequent data chunks are processed in an ongoing manner, as depicted by a start and end loop blocks 110 and 116. In start loop block 110, a subsequent chunk is retrieved from memory identified by the job. For each subsequent block, the accelerator will ensure that the state data that is being loaded in was generated by an accelerator (the same accelerator or another accelerator) or privileged software, and throw an error if the state information was not of this form. These operations are depicted by a decision block 112 and error end block 108. If the determination of decision block 112 is YES (state data that is loaded was generated by an accelerator or privileged software), the chunk is processed by the accelerator in a block 114. As depicted by end loop block 116, the logic loops back to start loop block 110 to retrieve the next chunk. The loop is repeated until submission of chunks for the job are completed.

Figure 1A:
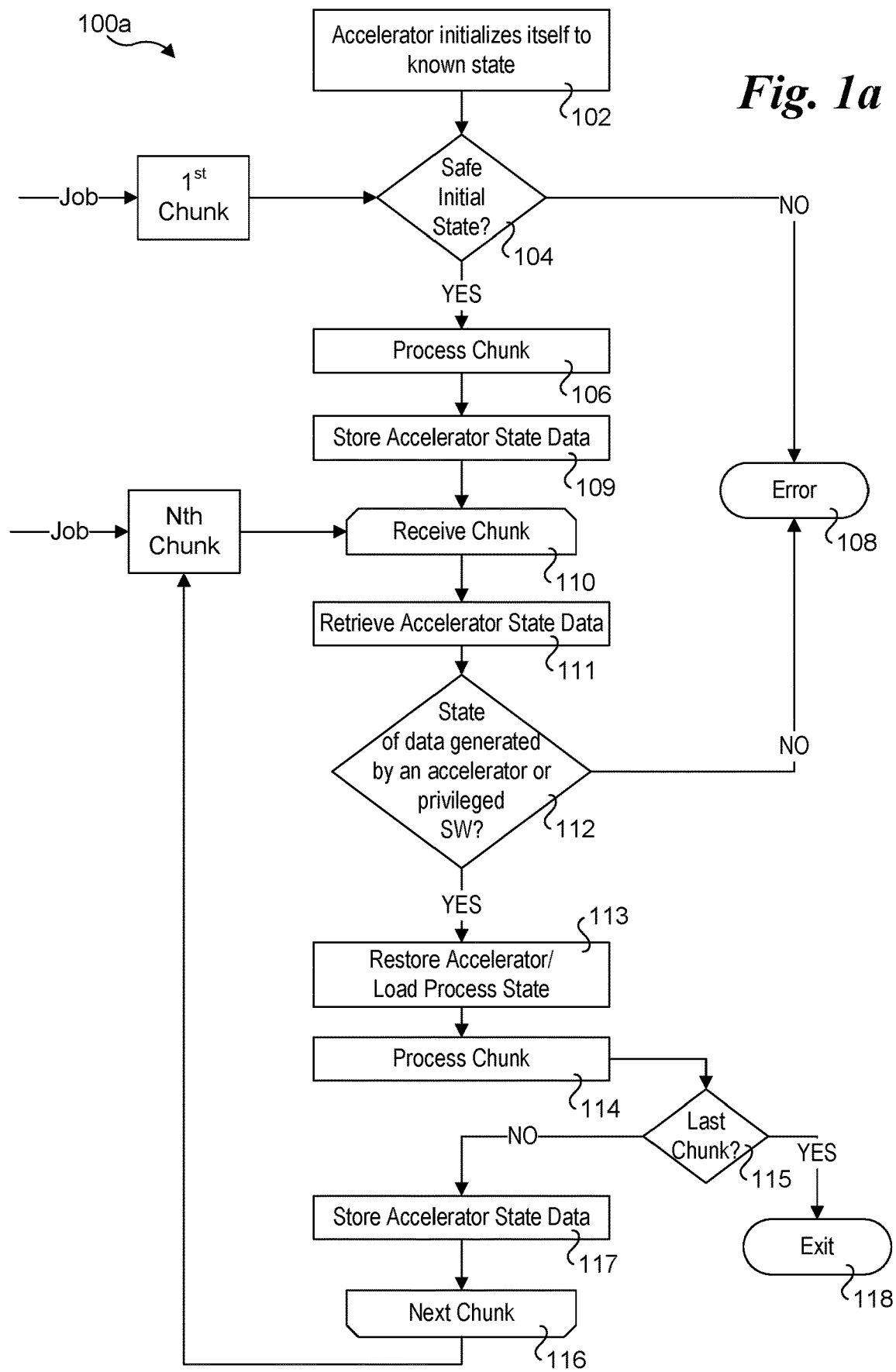
FIG. 1a is a flowchart illustrating an augmented version of the flowchart of FIG. 1 in the process implements an accelerator state store, retrieve, validate, and restore sequence, according to one embodiment.

FIG. 1a shows a flowchart 100a comprising an augmented version of flowchart 100 of FIG. 1. Under this implementation, accelerator state information is stored following processing of each chunk and reloaded and validated prior to processing a next chunk. For example, following processing of the first chunk in block 106, accelerator state information (data) is stored in a block 109. In the ongoing loop, the accelerator state data is retrieved and used to confirm the state of the loaded data (for the next chunk) was generated by an accelerator or privileged software. If the answer to decision block 112 is YES, the state of the accelerator is restored (using the retrieved accelerator state data) and/or the process state is restored (associated accelerator state information stored by privileged software) in a block 113. Following processing of the chunk in block 114, a determination is made in a decision block 115 to whether the chunk is the last chunk. If it is, the processing is completed, as depicted by an exit block 118. If there are more jobs/data chunks to be processed the logic proceeds to a block 117 in which the state information for the accelerator is stored prior to processing the next data chunk.

One way for the accelerator to ensure that the state data that is being loaded in was generated by an accelerator or privileged software is for the accelerator or privileged software to generate a message authentication code (MAC) for the state that it produces and saves. In connection with reloading the state using retrieved state data, the MAC is used by the accelerator to validate the retrieved state data.

Figure 2:
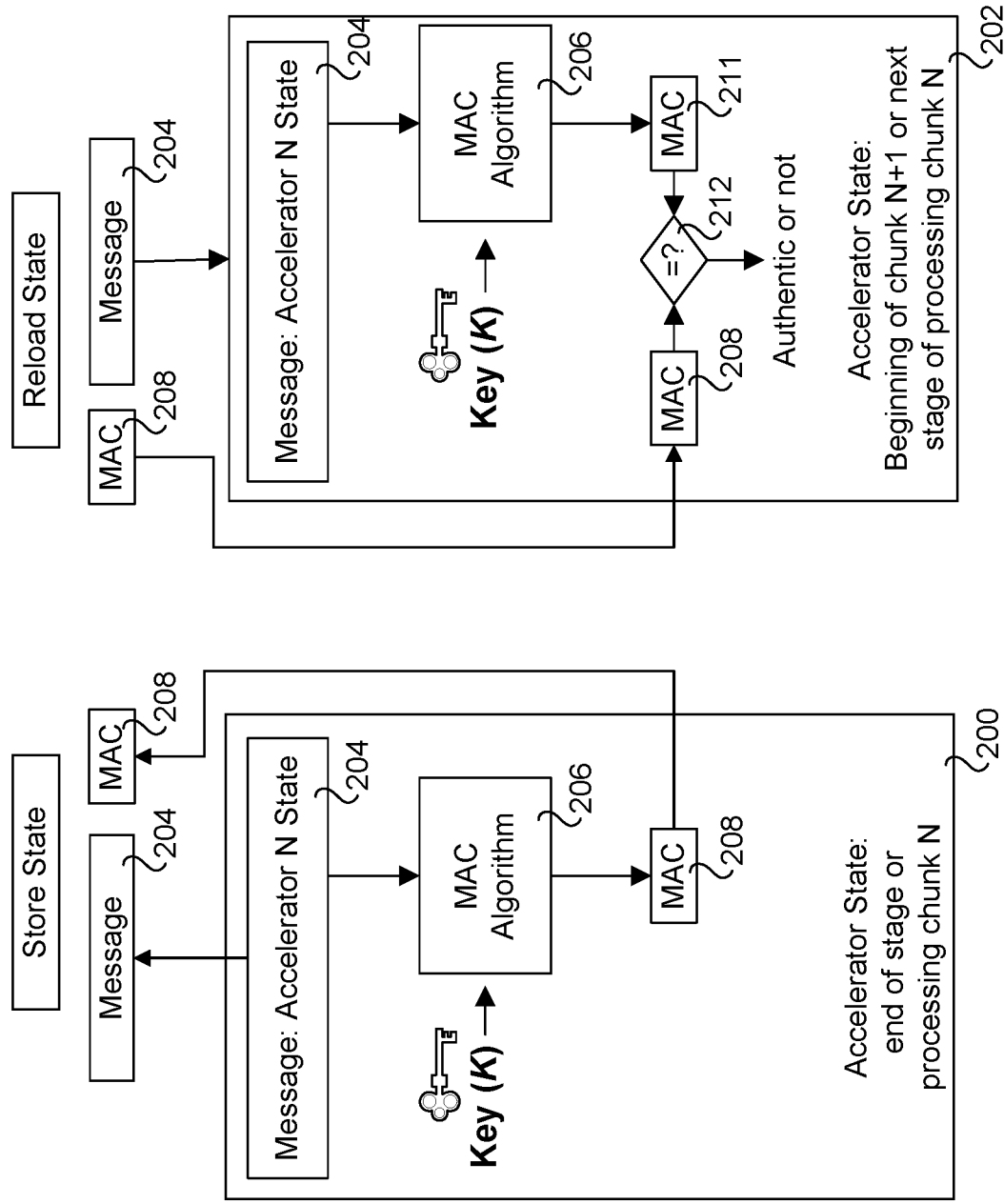
FIG. 2 is a schematic diagram illustrating use of a MAC algorithm and key in connection with storing accelerator state for a data chunk and validating the stored accelerator state using the MAC algorithm and key, according to one embodiment.

One embodiment of this approach is illustrated in FIG. 2. The left side of FIG. 2 shows an accelerator state 200 corresponding to the end of processing a chunk N or at the end of a stage in a multi-stage process used to process chunk N. The right side of FIG. 2 shows an accelerator state 202 corresponding to the beginning of processing a chunk N+1 or the beginning of the next stage of processing chunk N in the multi-stage process.

The accelerator generates a message 204 comprising a digest (e.g. 256-bit) of the state of the accelerator using accelerator state 202 such that no other entity can generate the digest. The accelerator is programmed with a key 'K' that is used to compute the MAC, which either cannot be read by software or can only be read by privileged software, such as in an operating system (OS) kernel. In one embodiment, key 'K' is stored in the accelerator hardware or otherwise stored in hardware on the platform. Message 204 and key 'K' are input to a MAC algorithm 206, which outputs a MAC 208. Message 204 and MAC 208 are then saved. Subsequently, as shown in the right-side of FIG. 2, message 204 and MAC 208 and retrieved to initiate a next processing state corresponding to accelerator state 202. Message 204 along with key 'K' are input to MAC algorithm 206, which outputs a MAC 210. MAC 210 is then compared to MAC 208 to verify there is a match, as depicted by a decision block 212. If MAC 208 and 210 match, message 204 is authenticated and the state is valid. If they do not match, message 204 is not authenticated and the state is invalid. When the state is valid, state information on the message digest is reloaded to restore the state of the accelerator in preparation for processing data chunk N+1 or processing the next stage for chunk N.

In one embodiment a MAC comprising an HMAC is constructed as defined in RFC 2104. HMAC uses a cryptographic hash function 'H' and a secret key 'K'. An iterative cryptographic hash function such as MD5 or SHA-1 may be used to calculate the HMAC. When these are used, the resulting MAC algorithm is called HMAC-MD5 or HMAC-SHA-1, for instance; however, the embodiments are not limited to HMAC-MD5 or HMAC-SHA-1, but rather may use any cryptographic hash function suitable for use in an HMAC algorithm. The cryptographic strength of the underlying hash function, along with the size and quality of the key and the size of the hash output length in bits, define the cryptographic strength of the HMAC.

The HMAC function definition is, $$HMAC(K, m) = H((K' \oplus opad) \| H((K' \oplus ipad) \| m))$$

$$K' = \begin{cases} H(K) & K \text{ is larger than block size} \\ K & \text{otherwise} \end{cases}$$

where:
H=Cryptographic hash function
m=Message to be authenticated
K=Secret key padded with extra 0's (ipad/opad) to the block size of the hash function.
K' is a block-sized key derived from the secret key
∥ denotes concatenation
⊕ denotes bitwise exclusive or (XOR)
opad is the block-sized outer padding, consisting of repeated bytes valued 0x5c
ipad is the block-sized inner padding, consisting of repeated bytes valued 0x36

Figure 3:
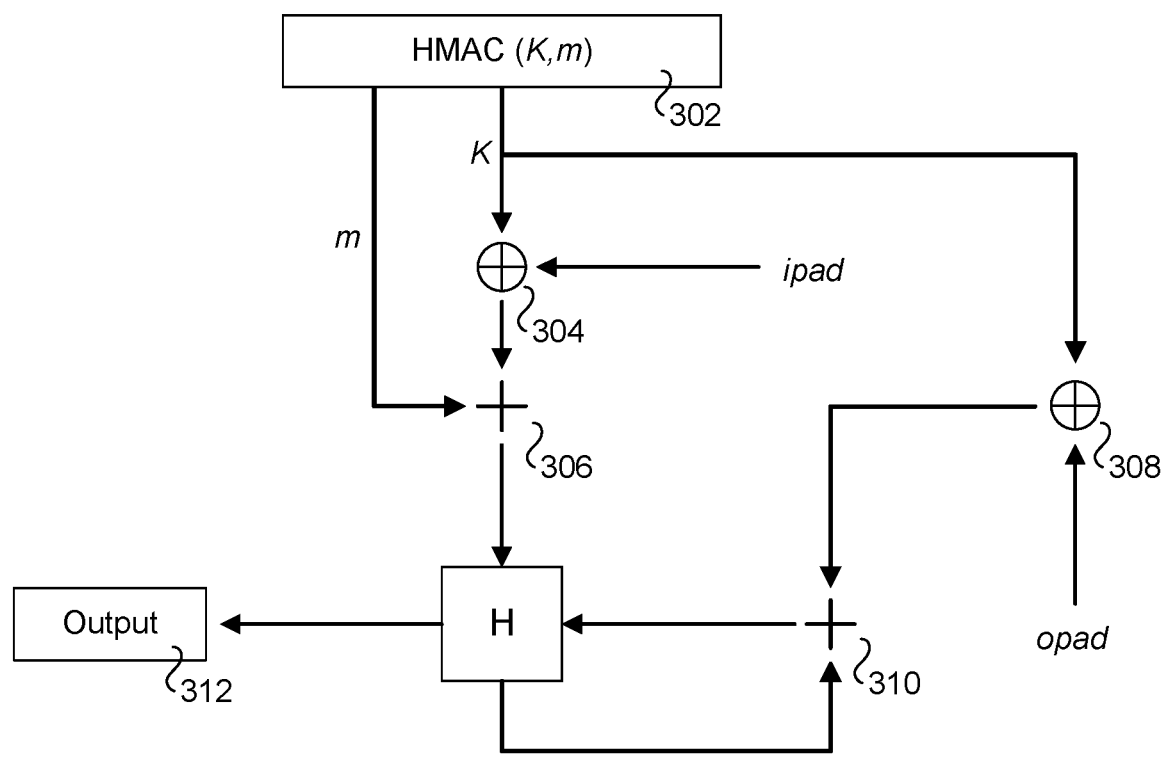
FIG. 3 is a diagram illustrating an implementation of the HMAC algorithm.

FIG. 3 shows a graphical representation of the HMAC algorithm. HMAC block 302 includes the secret key K and message m. Key K and the ipad are provided as inputs to an XOR block 304, which outputs the XOR result (1 or 0) to a summation block 306. Message m is also feed into summation block 306. The output of summation block 306 is provided as an input to hash function H.

Key K and the opad are provided as inputs to an XOR block 308, which output the XOR result (1 or 0) to a summation block 310. The second input to summation block 310 is an output from hash function 'H'. Hash function 'H' also produces an output 312.

Figure 4:
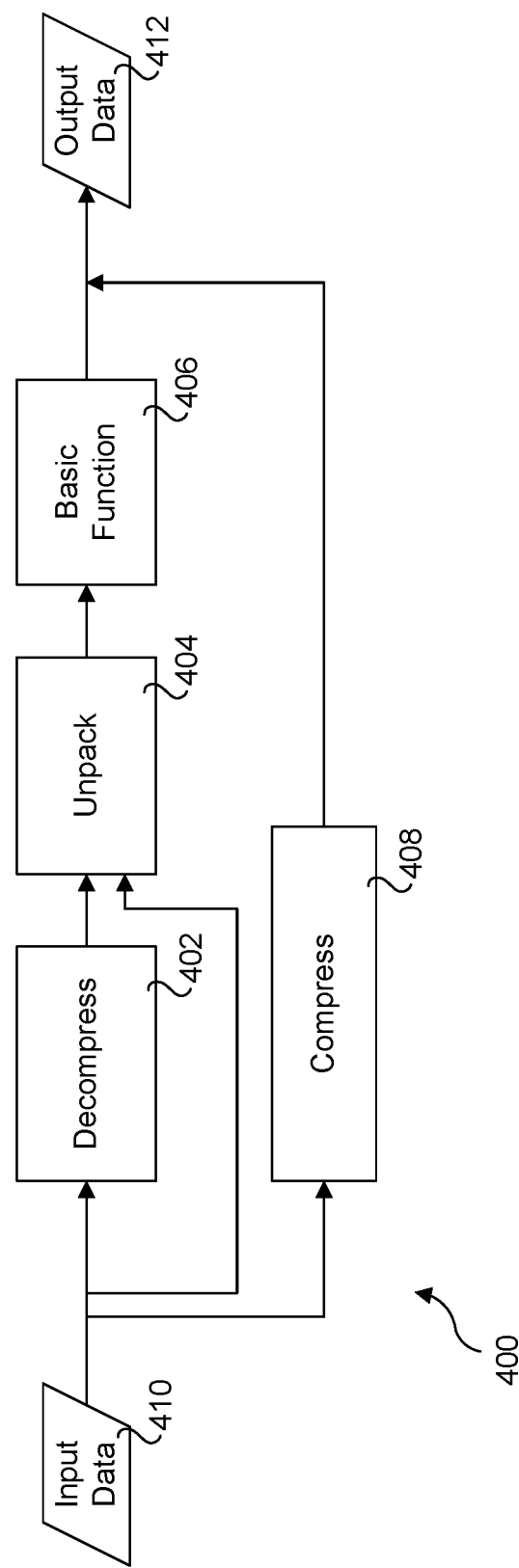
FIG. 4 is a diagram illustrating a pipeline implemented by an accelerator to process input data, such as decompression and associated operations.

FIG. 4 shows an example of a pipeline 400 implemented on accelerator. Pipeline 400 includes a decompress block 402, and unpack block 404, a basic function block 406 and a compress block 408. The pipeline is configured via applicable control logic (not shown) to route input data 410 (e.g., packets, chunks, etc.) through the appropriate blocks to produce output data 412.

Decompress block 402 is configured to support decompression operations using one or more algorithms. For example, in one embodiment the algorithms include the Deflate (LZ77) decompression algorithm. Unpack block 404 performs operations such as run-length encoding (RLE). Basic function block 406 performs one or more functions, such as SQL/Analytics primitives such as Scan, Filter, Select, Aggregates, etc. Compression block 408 performs compression operations using one or more compression algorithms, such as RLE, Huffman, LZW, LZ77, etc.

Figure 5:
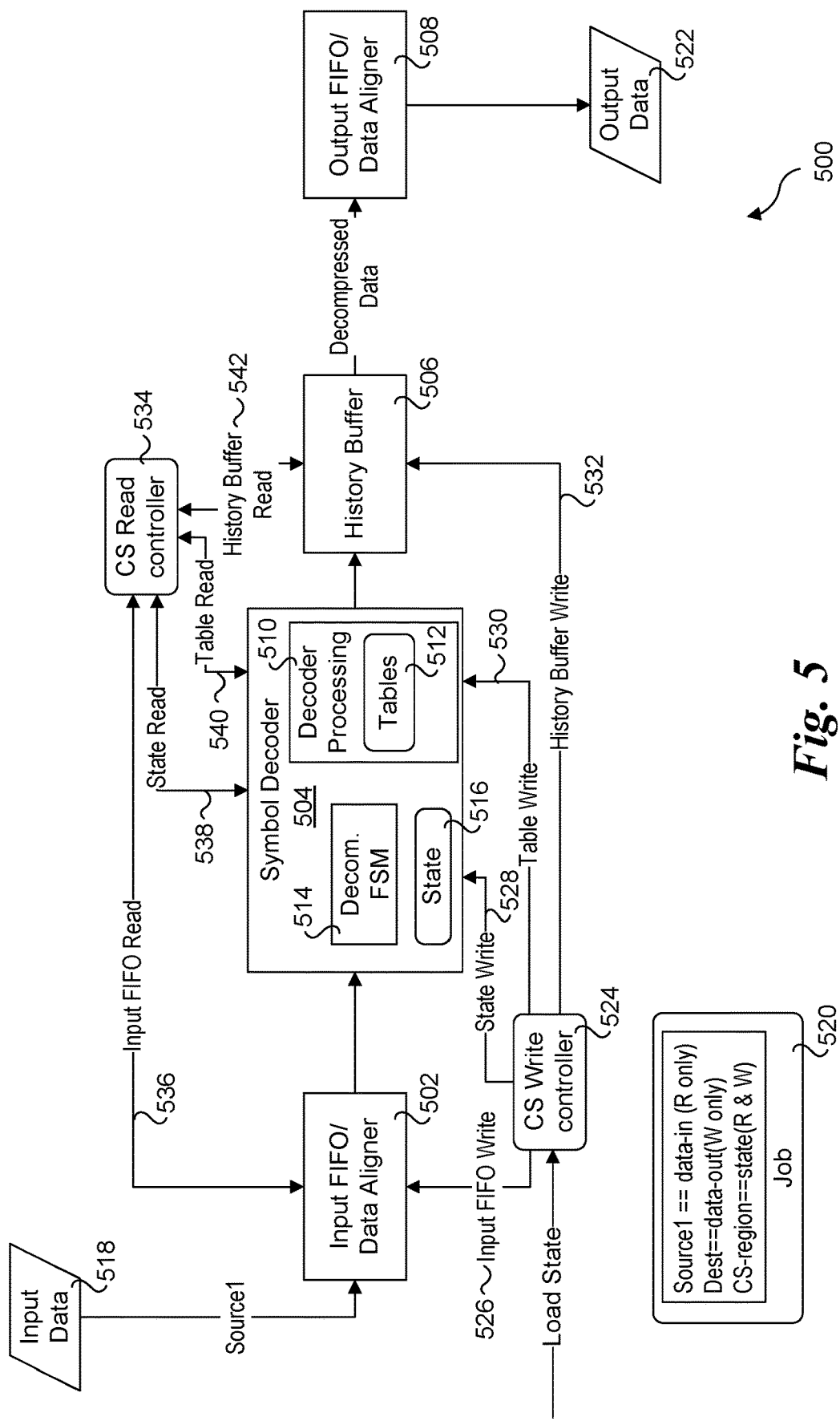
FIG. 5 is a schematic diagram illustrating an accelerator architecture for implementing a decompression algorithm such as Deflate in connection with managing the accelerator state, according to one embodiment.

FIG. 5 shows an architecture 500 configured to implement a decompression algorithm, such as Deflate. Architecture 500 includes an input FIFO (First-in, First-out)/data aligner 502, a symbol decoder 504, a history buffer 506, and an output FIFO/data aligner 508. Symbol decoder 504 includes a decoder processing block 510 including tables 512, a decompression finite state machine (FSM) 514 and has an associated state 516 comprising state information for the symbol decoder. In one embodiment of a Deflate decompressor, tables 512 are decompressor Huffman decoder tables and decoder processing block 510 includes a Huffman decoder. In one embodiment, symbol decoder 504 further includes a tree decoder (not shown).

As further illustrated in FIG. 5, input data 518 comprising Source1 is received at input FIFO/data aligner 502. In one embodiment, input data 518 is partitioned into a plurality of chunks, with the processing of each chunk being associate with a job, such as depicted by a job 520. In one embodiment, job 520 specifies an address for the Source1 input data (e.g., the address in memory of the chunk associated with the job), a destination address (Dest) for output data 522, an a configuration and state region (CS-region) in which state information is stored. Source1 is (R)ead only, Dest is (W)rite only, and the CS-region is (R)ead and (W)rite.

In one aspect, the processing of each chunk employs a multi-stage process, broadly including an input stage, a symbol decoder stage, a history stage, and an output stage. A given implementation may employ more or less stages; for example, the symbol decoder stage and history stage may be combined into a single stage.

The various stages have state information relating to input bits yet to be processed, state of the input aligner, FSM that denotes control state of the decompressor, tree decoder and symbol decoder data structures, history buffer, as well as output accumulator data/state. Corresponding state elements are loaded via a Source2 operand (depicted by "Load State") into a CS write controller 524. The accelerator CS information for the multiple stages is a data structure that the software uses to pass into jobs that are part of a larger processing request. The data structure has a plurality of control fields that need to be mutually consistent (e.g. the bits in the aligner, and the corresponding fields that say how many bits are valid, have been consumed etc.). In addition to fields from the internals of the decompressor, there can be fields that represent data from other blocks in the hardware pipeline such as the pack/unpack/RLE processors, the SQL processing blocks and so forth. As further detailed in FIGS. 6a and 6b below, the accelerator CS data structure is treated as a message for the MAC computation.

In some embodiments, the multi-stage process is implemented in a pipelined manner, with the processing of a chunk proceeding through the multiple stages. At the beginning of each stage processing cycle, state information previously written by the accelerator is loaded (Load State) into a CS write controller 524, which, following validation using the MAC comparison scheme of FIG. 2, restores state information for various components for which state information is stored by the accelerator, as depicted by input FIFO write 526, state write 528, table write 530, and history buffer write 532. Following (or in conjunction with) the completion of each processing cycle, the corresponding state information is stored using a CS read controller 534, which reads the state information from data structures, registers, etc., as applicable. This is depicted in FIG. 5 as input FIFO read 536, state read 538, table read 540, and history buffer read 542.

In other embodiments, including multi-stage embodiments, the state information is generated and stored following processing of a given chunk or during a predetermined stage associated with processing the given chunk. For example, these embodiments implement processing similar to that shown in FIG. 1a and described above, with the saved accelerator state information corresponding to input FIFO write 526, state write 528, table write 530, and history buffer write 532.

Figure 6A:
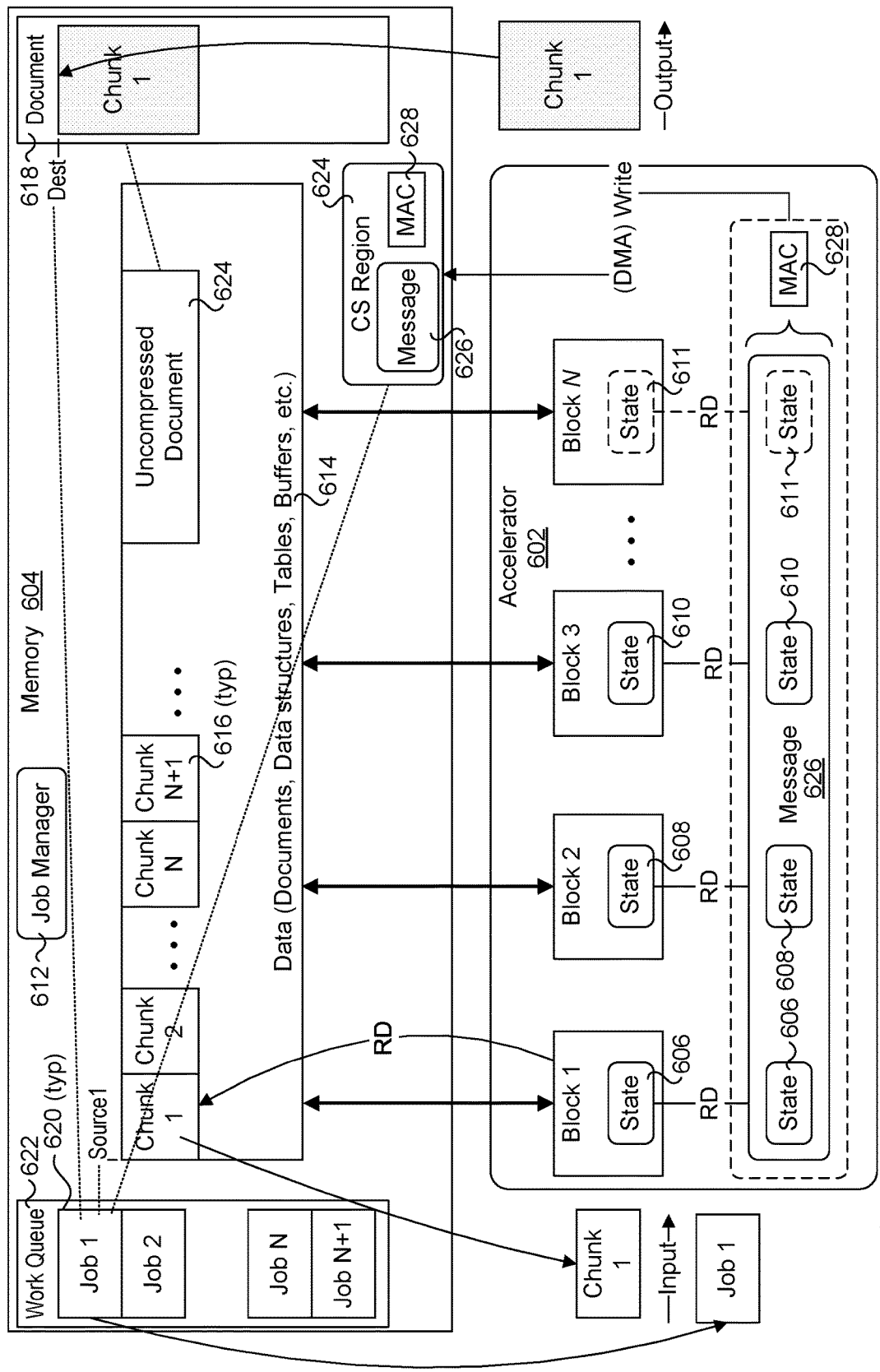
FIG. 6a is a schematic diagram illustrating an accelerator architecture including multiple processing blocks and associated operations for managing the state of the processing blocks, wherein the states of the processing blocks are stored following processing of a first data chunk.
Figure 6B:
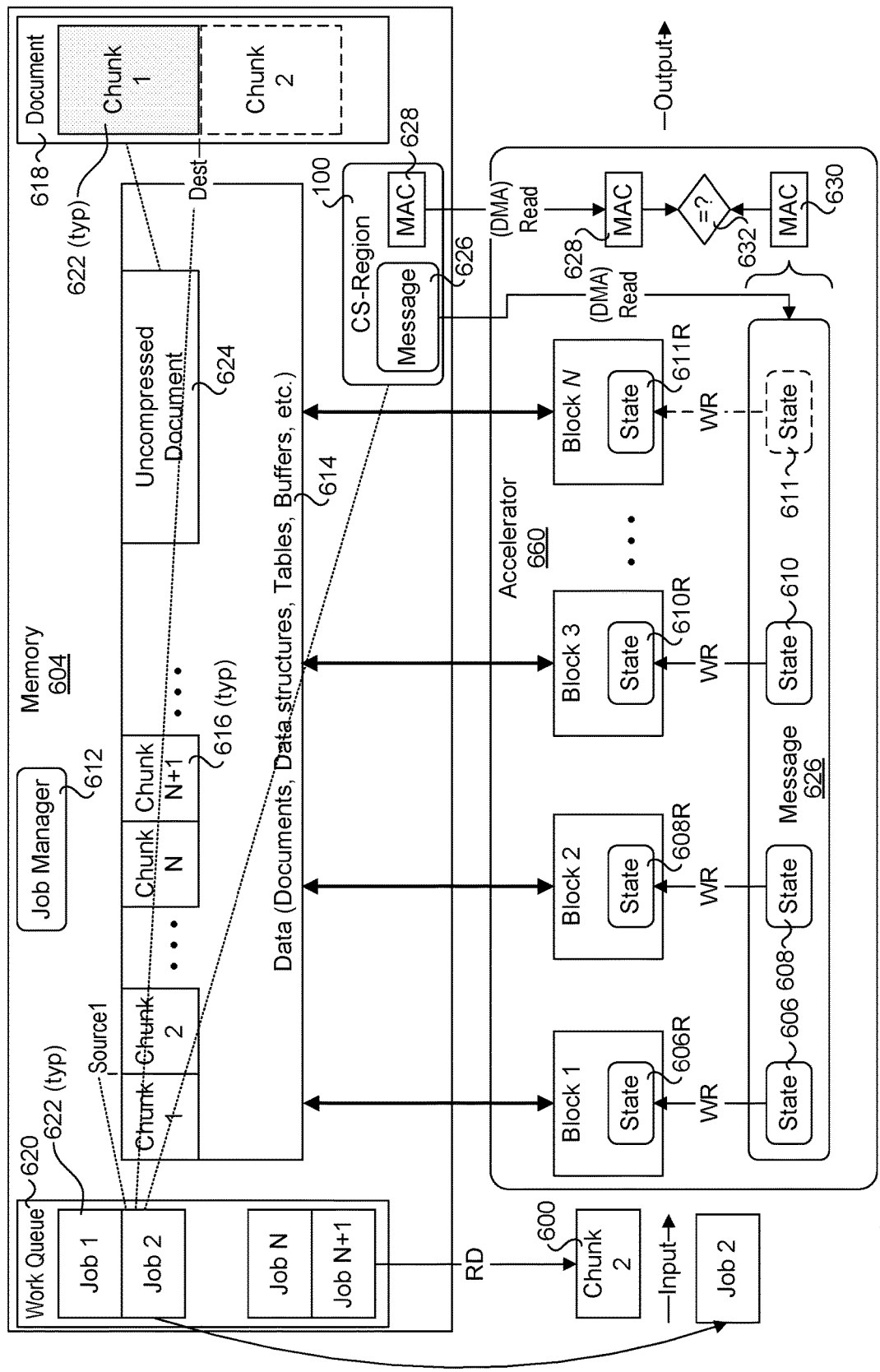
FIG. 6b is a schematic diagram illustrating the accelerator architecture of FIG. 6b in connection with restoring the states of the processing blocks prior to processing a second data chunk.

FIGS. 6a and 6b depict an architecture 600 configured to implement state store and reload operations, according to aspects of the foregoing embodiments. Architecture 600 includes an accelerator 602 and memory 604. In an implementation, architecture 600 would further include a processor, such as a multi-core processor employing a System on a Chip (SoC) architecture, that is used to execute software that manages the overall processing, including submission of jobs.

Accelerator 602 is depicted as having N processing blocks 1, 2, 3 . . . N, where N is two or more. Each processing block is implemented with an associated logic block in accelerator 602 and may perform one or more functions. Each processing block has respective state information that is stored and reloaded, as depicted by block states 606, 608, 610, and an optional block state 611.

Memory 604 is used to store and access various data and software associated with work performed by accelerator 602. For illustrative purposes these are generalized as a job manager 612 and data 614, which is representative of documents, data structures, tables, buffer, etc. accessed by accelerator 602 to process jobs assigned to the accelerator by job manager 612. Data 614 is depicted as including (compressed) chunks 616 and an uncompressed document 618 that represents a portion of the address space for memory 604 to which the uncompressed document content will be written.

Memory 604 is further depicted as including a work queue 622 having a plurality of jobs 620 that are queued to be submitted to accelerator 602 and a CS region 624. In one embodiment a job 620 includes address information similar to that shown for job 520 in FIG. 5 that identifies a respective chunk 616 via its Source1 address, a Dest address at which the decompressed chunk data are to be written, and a CS region address. In one embodiment, accelerator 602 also includes a work queue (not shown in FIGS. 6a and 6b). For simplicity, the following discussion does not include use of a work queue on accelerator 602; in practice, similar operations would be performed, except the accelerator would be processing jobs that are queue in the accelerator work queue rather than a work queue in memory.

Presume we are at the start of a new document, and Job 1, Job 2 . . . Job N, Job N+1 are jobs to be processed by accelerator 602 in order. Returning to flowchart 100 of FIG. 1a, prior to beginning the first Job (Job 1), the accelerator initializes itself to a known state as shown in block 102. In one embodiment, state information corresponding to the known state may be stored in CS region 624 or a separate predetermined location in memory 604. In one embodiment, the MAC validation scheme illustrated in FIGS. 2 and 6b may be applied to the known state information to validate the known state information.

In response to receiving Job 1, logic in block 1 will parse the Job address information to identify the Source1 address for chunk 1, the Dest address, and the CS region address. Processing of blocks 1-N will then be performed by accelerator 602 until decompression of chunk 1 has been completed, resulting in a decompressed chunk 1, which will be written to memory 604 beginning at the Dest address, as depicted at the right side of FIG. 6a.

Upon completion of processing of a job (e.g., decompression of chunk 1), accelerator state information is stored into CS region 624. As depicted, state information 604, 606, 608 and (optionally) 610 is read from respective processing blocks 1, 2, 3, and N, and combined into a message 626. For example, state information read from respective processing blocks may be concatenated using an optional predefined separator, such as a comma, a period or semicolon, etc. to create a message. In another embodiment, the configuration of the state information is predefined such that a separator is not used. In a manner similar to that shown in FIG. 2 and discussed above, message 626 is input to a MAC algorithm (such as but not limited to an HMAC algorithm) to generate a MAC 628, and message 626 and MAC 628 is written to CS region 624.

FIG. 6b shows operations performed by architecture 600 at the beginning of processing a next job (Job 2) and chunk (Chunk 2). In one aspect, these operations are similar to those depicted for accelerator state 202 (beginning of chunk N+1) in FIG. 2 discusses above. Upon receipt of Job 2, accelerator 602 will parse the job descriptor and read the address for CS region 624. The message and MAC in CS region 624 (in this case message 626 and MAC 628) will be read from CS region 624, as shown at the bottom portion of FIG. 6b. Accelerator 602 will input the read message 626 to the same MAC algorithm used to store message 626, generating a MAC 630. As depicted by a decision block 632, MAC 628 and MAC 630 will be compared to validate message 626—if they match, message 626 is valid; otherwise message 626 is invalid.

When message 626 is valid, the state information contained in message 626 (depicted by state 606, 608, 610, and 612) will be written to corresponding processing blocks 1, 2, 3 . . . and (optional) N. The restored state information is depicted as restored states 606R, 608R, 610R and (optional) 611R. Generally, the state information for the respective processing blocks may be delineated by the predefined separator used when creating message 626 in FIG. 6a.

Once the state of accelerator 602 is restored, the accelerator may begin processing chunk 2. In accordance with flowchart 100a of FIG. 1a, we are now at block 114 in which chunk 2 is processed. The processing of the loop operations in FIG. 1a are repeated in an ongoing manner until the last job and chunk are processed. As depicted in FIG. 1a, following processing of the last chunk the process exits without storing the accelerator state.

The foregoing embodiments may be extended to support further security. For example, in one embodiment, the MAC can be calculated over the message plus additional data, such as the process identifier (PASID) for the job. This can provide an additional layer of protection where valid state from another user cannot be misused by a malicious user.

Another extension is to allow privileged software such as the operating system (OS) or Virtual Machine Manager (VMM) or Hypervisor to read the MAC key, if they are in the trust boundary. Then software can continue a job that was started in the hardware if done via a kernel call. The kernel will then be able to provide any state data to the accelerator as it can generate a valid MAC (it is assumed that the OS is trusted in this scenario). However, user processes cannot load the accelerator with random state data, as they cannot generate a valid MAC since they don't have access to the MAC key.

Exemplary Platform Configurations

Figure 7A:
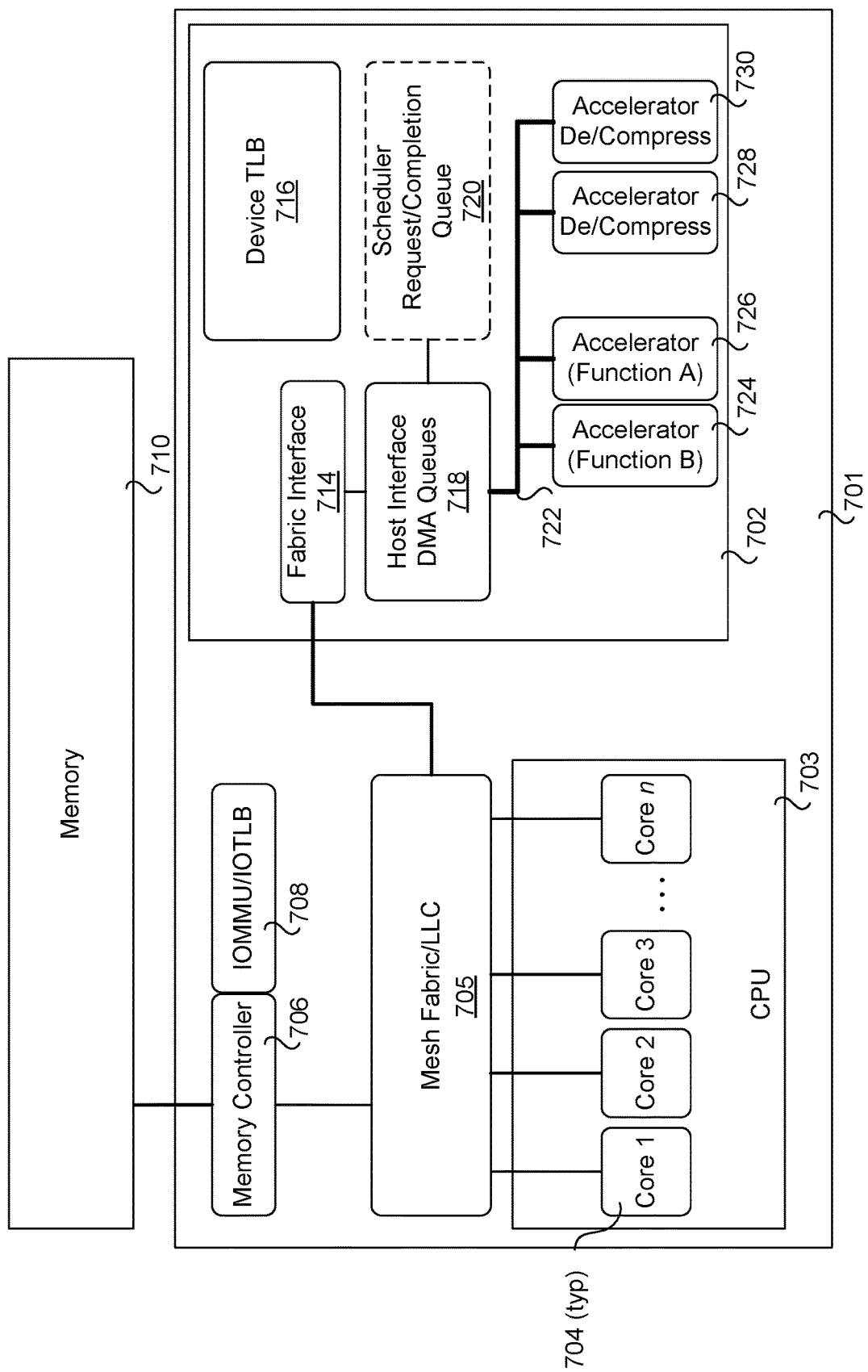
FIG. 7a is a schematic diagram of a platform architecture including a processor having an on-chip accelerator configured to implement accelerator state operations in accordance with one or more embodiments disclosed herein.

FIG. 7a shows a platform architecture 700a including a processor 701 having an on-chip accelerator 702 (also referred to as an accelerator complex when the accelerator supports multiple instances of accelerator functions). Processor 701 includes a Central Processing Unit (CPU) 703 including n cores 704, each with a private L1 and L2 cache (not shown). Each of cores 704 is connected to a mesh fabric/LLC (last-level cache) block 705, which is coupled to a memory controller 706 with an associated Input-Output Memory Management Unit and Input-Output Translation Lookaside Buffer (IOMMU/IOTLB) 708. Memory controller 706 is coupled to memory 710, which is illustrative of one or more DRAM memory devices, such as DDR4 DIMMS. Memory 710 may also be implemented using one or more Non-Volatile DIMMs (NVDIMMs). Generally, Memory controller 706 would be coupled to the DRAM memory devices with one or more memory channels per DRAM memory device (not shown).

FIG. 7 further shows an embodiment of an on-chip accelerator 702, which is representative of various types of accelerators. On-chip accelerator 702 includes a fabric interface 714, a device TLB 716, host interface DMA queues 718, an optional scheduler request/completion queue 720, and a bus 722 to which multiple accelerators are coupled as depicted by accelerators 724, 726, 728, and 730. Fabric interface 714 is generally illustrative of various types of IO interfaces that can connect an on-chip accelerator to the interconnect infrastructure on the processor/SoC, as collectively illustrated and described herein as a mesh fabric. The interconnect structure and protocol may generally include both proprietary and standards-based interconnects. In some embodiments, jobs are queued in host interface DMA queues and accessed from the DMA queues rather than from memory 710. Optional scheduler request/completion queue 720 may be used to schedule processing of jobs and/or implement a completion queue to mark when jobs are finished.

Accelerators are generally used to off-load CPU intensive tasks from a processor's cores, such as compression and decompression functions, which are math-intensive. In the embodiments herein, some or all of the accelerators may be further configured to generate a decryption key and used the decryption key for performing decryption and (optional) encryption operations. For illustrative purposes, accelerators 724 and 726 are depicted as being configured to perform the respective functions A and B, such as but not limited to encryption and decryption. Meanwhile, accelerators 728 and 730 are depicted as performing compression and/or decompression operations in accordance with one or more embodiments described herein. For example, in one embodiment one or both of accelerators 728 and 730 have a configuration similar to accelerator 602 shown in FIGS. 6a and 6b. In another embodiment, one or both of accelerators 728 and 730 is configured with blocks and components similar to that shown in architecture 500 of FIG. 5.

Figure 7B:
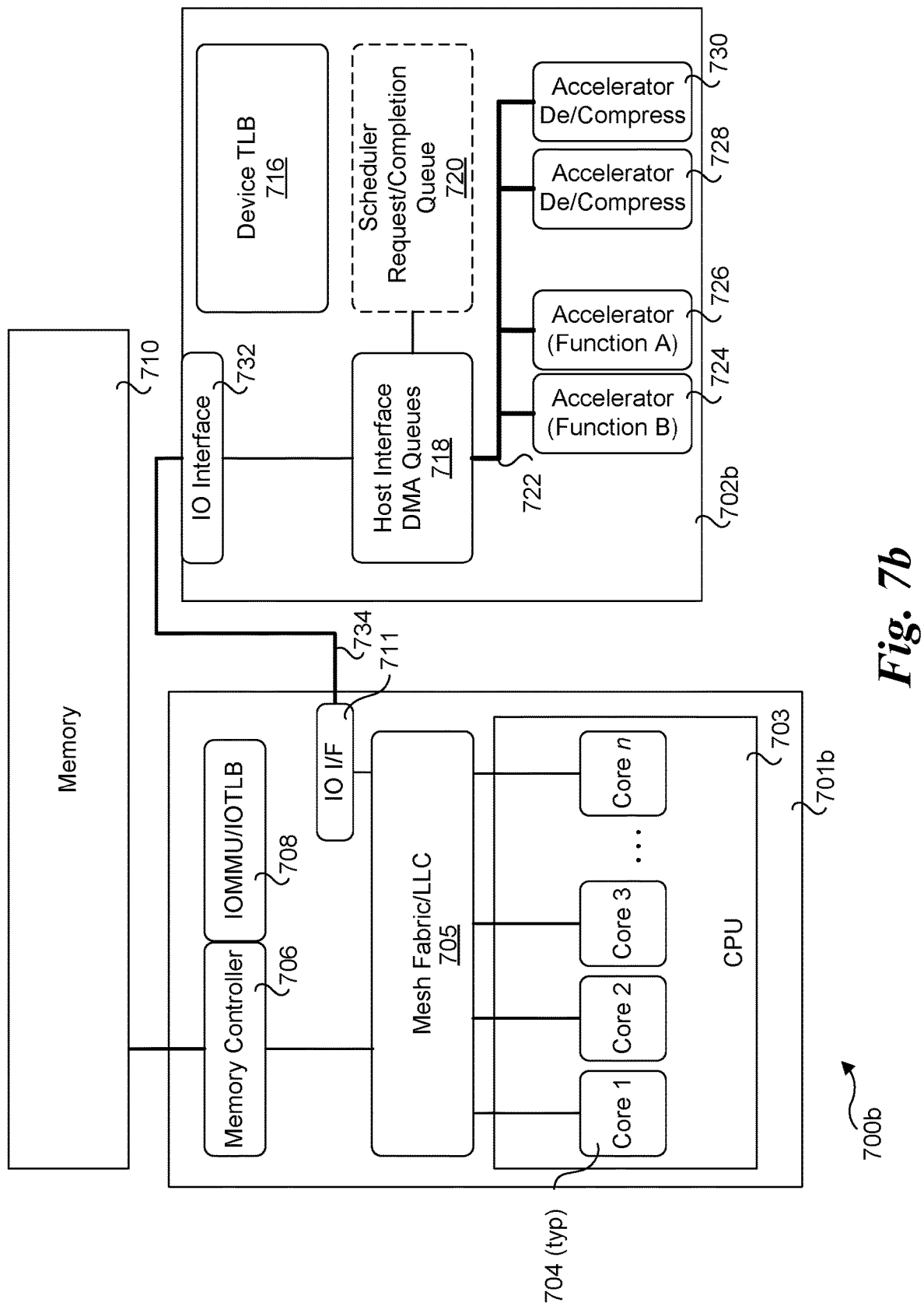
FIG. 7b is a schematic diagram of a variant of the platform architecture of FIG. 7a under which the processor and accelerator are separate components.

FIG. 7b shows a platform architecture 700b comprising a variant of architecture 700a in which the processor 701b and accelerator 702b are separate components, and wherein like-numbered components in architectures 700a and 700b perform similar operations and/or functions. Under architecture 700b, processor 701b includes an IO (Input-Output) interface (I/F) 711 that is coupled to an IO interface 732 on accelerator 702b via a link 734. In one embodiment, IO interfaces 711 and 732 are Peripheral Component Interconnect Express (PCIe) interfaces, and link 734 is a PCIe link comprising any of 1, 2, 4, 8, 16, or 32 lanes. In this embodiment, IO interface 711 is a PCIe Root Port that is coupled to a PCIe Root Complex (not shown), and accelerator 702b is able to read from and write to memory 710 using PCIe DMA transactions.

Figure 7C:
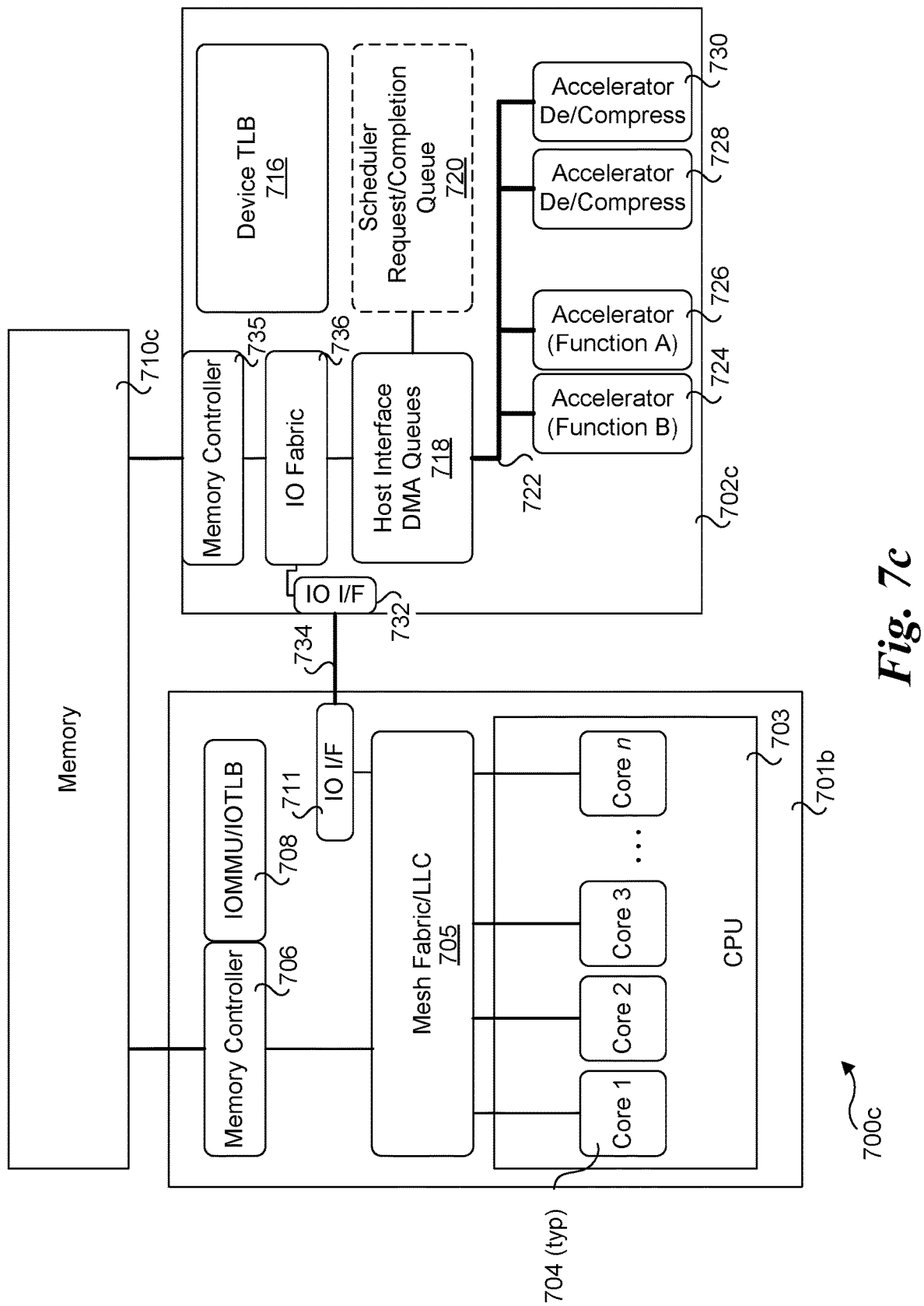
FIG. 7c is a schematic diagram of a variant of the platform architecture of FIG. 7b under which the accelerator includes a memory controller and is enabled to directly write to and read from memory.

FIG. 7c shows a platform architecture 700c comprising a variant of architecture 700b in which an accelerator 702c further includes a memory controller 735 that is coupled to a dual-port memory 710c. IO interface 732 and memory controller 735 is coupled to an IO fabric 736. Under platform architecture 700c, accelerator 702c is able to directly write to and read from dual port memory 710c.

Implementations with Multiple Accelerators

In some embodiments, two or more accelerators may be used to perform processing of a document or the like, wherein the state of a first accelerator is stored followed by a second accelerator accessing the stored state information and (following validation with its MAC) and loading to the accessed state information to resume processing of a current chunk or a next chunk. Under this scheme, each of the two or more accelerators would have a copy of the same MAC key (or otherwise have a mechanism for security accessing the same MAC key).

Figure 2A:
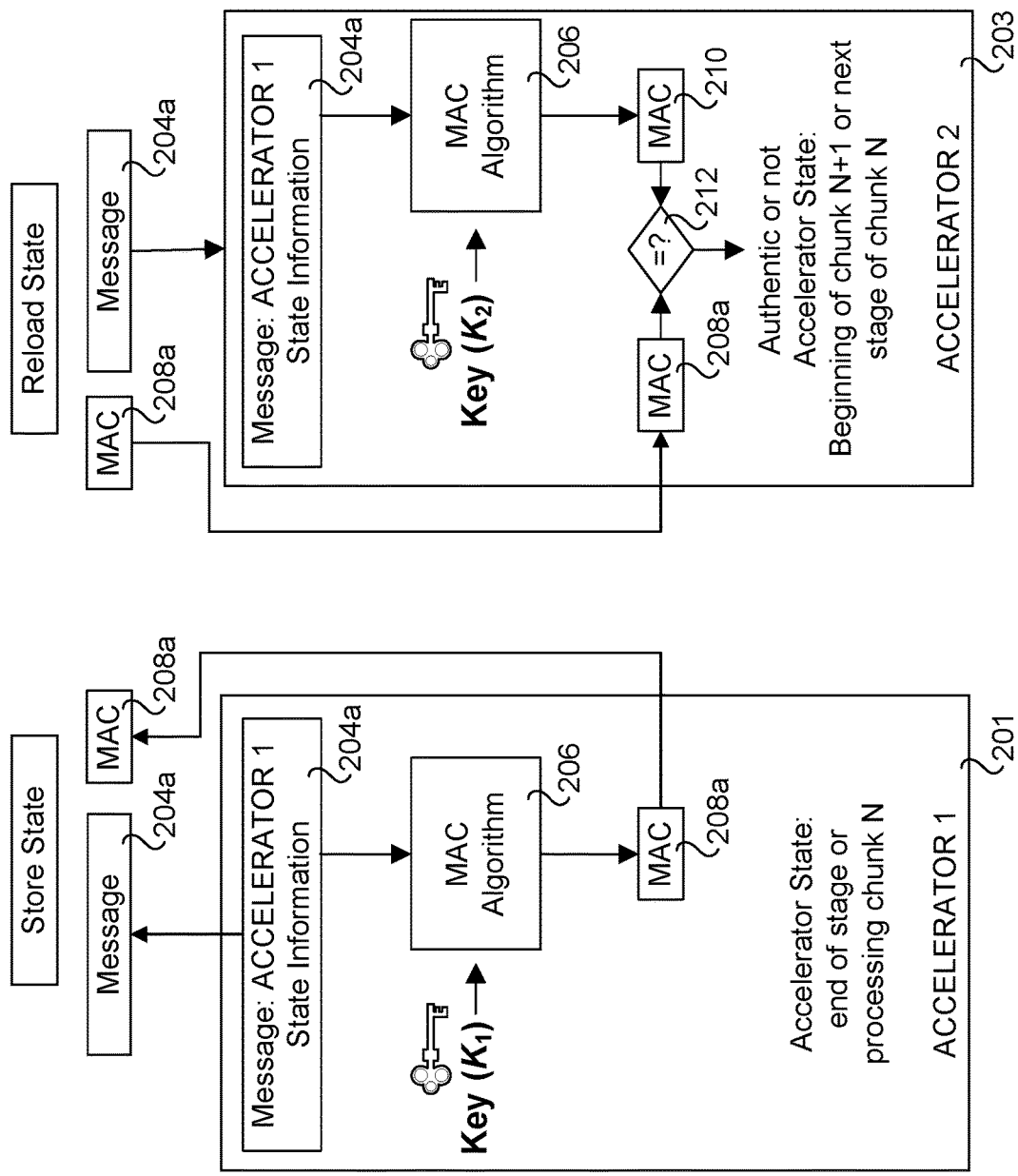
FIG. 2a is a schematic diagram illustrating use of a MAC algorithm and key in connection with storing accelerator state for a first accelerator operating on data chunk and validating the stored accelerator state using the MAC algorithm and key on a second accelerator, according to one embodiment.

An example of storing and restoring states when processing data using two accelerators is shown in FIG. 2a. Generally, like numbered components and blocks in FIG. 2 and FIG. 2a perform similar functions or represent similar data; accordingly, the following focuses on differences between the embodiment of FIGS. 2 and 2a.

As shown in FIG. 2a, a first accelerator 201 (ACCELERATOR 1) uses a key $K_1$ with MAC algorithm 206 to generate a MAC 208a using a message 204a corresponding to the state of ACCELERATOR 1, with the message 204a and MAC 208a being stored, in a similar manner to that described above for FIG. 2. However, in the embodiment of FIG. 2a, the stored accelerator state information corresponding to message 204a and MAC 208a is accessed by a second accelerator 203 (ACCELERATOR 2) rather than the same accelerator. Accelerator 203 has a key $K_2$ that is identical to key $K_1$, which is used by a MAC algorithm 206 to process message 204a to generate a MAC 210a, which is compared with MAC 208a to validate the state information. When valid, the state information is (re)loaded to ACCELERATOR 2, which either begins processing the next data chunk or begins the next stage in processing the current data chunk.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'n' and capital letters such as 'N' in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for performing processing operations of a data file comprising:
    using a first accelerator to begin processing operations on a data chunk of the data file;
    storing state information relating to a state of the first accelerator during or following processing the data chunk, the state information that is stored being generated by the first accelerator or by privileged software by,
        generating a message comprising the state information associated with the state of the first accelerator during or following processing the data chunk;
        applying a Message Authentication Code (MAC) algorithm to the message to generate a first MAC;
        storing the state information comprising the message and the first MAC;
    accessing, via the first accelerator or a second accelerator, the stored state information;
    validating, via the first accelerator or the second accelerator, that the stored state information that is accessed was generated by the first accelerator or by the privileged software by,
        applying the MAC algorithm to the message that is accessed to generate a second MAC; and
        validating the state information when the first MAC matches the second MAC;
    and
    when the stored state information is valid,
        loading the state information to the first accelerator or to the second accelerator;
    and
        beginning processing a next data chunk of the data file or continue processing the data chunk with the first accelerator or the second accelerator.

2. The method of claim 1, wherein the MAC algorithm comprises a Hash-based Message Authentication Code (HMAC) algorithm.

3. The method of claim 1, wherein the first accelerator includes a plurality of processing blocks that are implemented to process data chunks, and the method further comprises:
    for each of at least a portion of the plurality of processing blocks,
        obtaining state information for that processing block; and
    generating the message using the state information obtained for the at least a portion of the processing blocks.

4. The method of claim 1, wherein processing of the data chunk is associated with a job having a process address space identifier (PASID), and wherein the message further comprises the PASID.

5. The method of claim 1, wherein the first accelerator is implemented on a platform including memory, wherein the first accelerator generates the message comprising the state information associated with the first state of the first accelerator and applies the MAC algorithm to generate the first MAC, and wherein the first accelerator stores the message and the first MAC in the memory.

6. The method of claim 1, wherein at least one of the first and second accelerator is implemented in a platform including a host processor to which the at least one of the first and second accelerator is coupled or on which the at least one of the first and second accelerator is embedded, the platform including memory coupled to the processor having a user space, wherein the state information is stored in the user space.

7. The method of claim 1, wherein the data chunk is a first data chunk, further comprising initializing the first accelerator to a known state prior to performing processing on the first data chunk.

8. The method of claim 1, wherein the processing operations comprise compression, decompression, encryption, or decryption.

9. An accelerator apparatus, comprising:
    at least one accelerator including a plurality of processing blocks;
    at least one of an input-output (TO) interface and a memory controller;
    wherein the accelerator apparatus is configured to be implemented in a platform including memory, and wherein the accelerator apparatus is configured to,
        begin, using the plurality of processing blocks corresponding to a first accelerator, processing operations on a data chunk of a data file
        generate state information relating to a state of the first accelerator during or following processing the data chunk,
            generating a message comprising the state information associated with the state of the first accelerator during or following processing the data chunk;
            applying a Message Authentication Code (MAC) algorithm to the message to generate a first MAC;
            storing the message and the first MAC;
        store the state information that is generated in the memory as the message and the first MAC;
        access previously stored state information from the memory comprising the message and the first MAC,
        validate the previously stored state information was generated by the first accelerator by,
            applying the MAC algorithm to the message that is accessed to generate a second MAC; and
            validating the previously stored state information when the first MAC matches the second MAC;
        and
        when the previously stored state information is valid,
            load the previously stored state information to the first accelerator or load the previously stored state information to a second accelerator; and
            begin processing operations on a next data chunk or continue processing operations on the data chunk using the first accelerator or the second accelerator.

10. The accelerator apparatus of claim 9, wherein the data chunk is a first data chunk, and wherein the first accelerator is configured to a known state prior to performing processing on the first data chunk.

11. The accelerator apparatus of claim 9, wherein the MAC algorithm comprises a Hash-based Message Authentication Code (HMAC) algorithm.

12. The accelerator apparatus of claim 9, further configured to:
    for each of at least a portion of the plurality of processing blocks for the first accelerator,
        obtain state information for that processing block; and
    generate the message using the state information obtained for the at least a portion of the plurality of processing blocks for the first accelerator.

13. The accelerator apparatus of claim 9, wherein processing of the data chunk is associated with a job having a process address space identifier (PASID), and wherein the message further comprises the PASID.

14. The accelerator apparatus of claim 9, further configured to:
receive or access a job including a job descriptor including a source address identifying a location in the memory of the data chunk, a destination address identifying a location in the memory to which output data generated by processing the data chunk are to be written, and a configuration state (CS) region in the memory in which state information is stored;
access the state information stored in the CS region;
validate the state information that is accessed;
when the state information is valid,
load the state information into the first accelerator;
load the data chunk from the memory located at the source address;
process the data chunk with the first accelerator to generate the output data; and
write the output data to the destination address.

15. The accelerator apparatus of claim 9, comprising a System on a Chip (SoC) processor including:
a plurality of processor cores;
an interconnect fabric, communicatively coupled to each processor core;
a memory controller, communicatively coupled to the interconnect fabric and having one or more memory channels,
wherein the memory in the platform comprises one or more memory devices coupled to the one or more memory channels, and wherein the platform employs a shared virtual memory (SVM) architecture.

16. The accelerator apparatus of claim 9, wherein the processing operations comprise compression, decompression, encryption, or decryption.

17. A computer platform, comprising:
a processor, including,
a plurality of processor cores,
an interconnect fabric, communicatively coupled to the plurality of processor cores;
a memory controller, communicatively coupled to the interconnect fabric and having one or more memory channels;
a first input-output (TO) interface, communicatively coupled to the interconnect fabric;
system memory comprising one or more memory devices, each communicatively coupled to at least one memory channel of the memory controller; and
an accelerator device comprising at least one accelerator including a plurality of processing blocks;
a second IO interface coupled to the first IO interface via a link;
wherein the accelerator device is configured to,
begin, using the plurality of processing blocks for a first accelerator, processing operations on a data chunk of a data file;
generate state information relating to a state of the first accelerator during or following processing the data chunk,
generating a message comprising the state information associated with the state of the first accelerator during or following processing the data chunk;
applying a Message Authentication Code (MAC) algorithm to the message to generate a first MAC;
storing the message and the first MAC;
store the state information that is generated in the system memory as the message and the first MAC;
access previously stored state information from the system memory,
validate the previously stored state information was generated by the first accelerator by,
applying the MAC algorithm to the message that is accessed to generate a second MAC; and
validating the previously stored state information when the first MAC matches the second MAC; and
when the previously stored state information is valid,
load the previously stored state information to the first accelerator to restore the state of the accelerator device or load the previously stored state information to a second accelerator; and
begin processing a next data chunk or continue processing the data chunk with the first accelerator or the second accelerator.

18. The compute platform of claim 17, wherein the accelerator device is further configured to:
for each of at least a portion of the plurality of processing blocks for the first accelerator,
obtain state information for that processing block; and
generate the message using the state information obtained for the at least a portion of the plurality of processing blocks.

19. The compute platform of claim 17, wherein the accelerator device is further configured to:
receive or access a job including a job descriptor including a source address identifying a location in the system memory of the data chunk, a destination address identifying a location in the system memory to which output data generated by processing the data chunk are to be written, and a configuration state (CS) region in the system memory in which state information is stored;
access the state information stored in the CS region;
validate the state information that is accessed;
when the state information is valid,
restore a state of the first accelerator with the state information;
load the data chunk from the system memory located at the source address;
process the data chunk with the first accelerator to generate the output data; and
write the output data to the destination address.

20. The compute platform of claim 17, wherein the processing operations comprise compression, decompression, encryption, or decryption.

* * * * *

UNITED STATES PATENT AND TRADEMARK OFFICE
CERTIFICATE OF CORRECTION

PATENT NO. : 12,052,370 B2
APPLICATION NO. : 16/865492
DATED : July 30, 2024
INVENTOR(S) : Vinodh Gopal It is certified that error appears in the above-identified patent and that said Letters Patent is hereby corrected as shown below:

In the Claims

Claim 9 should read: An accelerator apparatus, comprising:
at least one accelerator including a plurality of processing blocks;
at least one of an input-output (IO) interface and a memory controller;
wherein the accelerator apparatus is configured to be implemented in a platform including memory, and wherein the accelerator apparatus is configured to,
begin, using the plurality of processing blocks corresponding to a first accelerator, processing operations on a data chunk of a data filegenerate state information relating to a state of the first accelerator during or following processing the data chunk by,
generating a message comprising the state information associated with the state of the first accelerator during or following processing the data chunk;
applying a Message Authentication Code (MAC) algorithm to the message to generate a first MAC;
storing the message and the first MAC;
store the state information that is generated in the memory as the message and the first MAC;
access previously stored state information from the memory comprising the message and the first MAC,
validate the previously stored state information was generated by the first accelerator by,
applying the MAC algorithm to the message that is accessed to generate a second MAC; and
validating the previously stored state information when the first MAC matches the second MAC; and
when the previously stored state information is valid,
    load the previously stored state information to the first accelerator or load the previously stored state information to a second accelerator; and
begin processing operations on a next data chunk or continue processing operations on the data chunk using the first accelerator or the second accelerator.

Claim 17 should read: A computer platform, comprising:
a processor, including,
a plurality of processor cores,
an interconnect fabric, communicatively coupled to the plurality of processor cores;

Signed and Sealed this
Third Day of September, 2024

Katherine Kelly Vidal
*Director of the United States Patent and Trademark Office* a memory controller, communicatively coupled to the interconnect fabric and having one or more memory channels;
a first input-output (IO) interface, communicatively coupled to the interconnect fabric;
system memory comprising one or more memory devices, each communicatively coupled to at least one memory channel of the memory controller; and
an accelerator device comprising at least one accelerator including a plurality of processing blocks;
a second IO interface coupled to the first IO interface via a link;
wherein the accelerator device is configured to,
begin, using the plurality of processing blocks for a first accelerator, processing operations on a data chunk of a data file;
generate state information relating to a state of the first accelerator during or following processing the data chunk by,
generating a message comprising the state information associated with the state of the first accelerator during or following processing the data chunk;
applying a Message Authentication Code (MAC) algorithm to the message to generate a first MAC;
storing the message and the first MAC;
store the state information that is generated in the system memory as the message and the first MAC;
access previously stored state information from the system memory,
validate the previously stored state information was generated by the first accelerator by,
applying the MAC algorithm to the message that is accessed to generate a second MAC; and
validating the previously stored state information when the first MAC matches the second MAC; and
when the previously stored state information is valid,
    load the previously stored state information to the first accelerator to restore the state of the accelerator device or load the previously stored state information to a second accelerator; and
begin processing a next data chunk or continue processing the data chunk with the first accelerator or the second accelerator.